(12) United States Patent
Chkodrov et al.

(10) Patent No.: US 7,676,461 B2
(45) Date of Patent: Mar. 9, 2010

(54) IMPLEMENTATION OF STREAM ALGEBRA OVER CLASS INSTANCES

(75) Inventors: Gueorgui B. Chkodrov, Redmond, WA (US); Paul F. Ringseth, Bellevue, WA (US); Tihomir T. Tarnavski, Redmond, WA (US); Andy Shen, Seattle, WA (US); Roger Shane Barga, Bellevue, WA (US); Jonathan Goldstein, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 405 days.

(21) Appl. No.: 11/779,574

(22) Filed: Jul. 18, 2007

(65) Prior Publication Data

US 2009/0024622 A1 Jan. 22, 2009

(51) Int. Cl.
G06F 17/30 (2006.01)
(52) U.S. Cl. .................. 707/4; 707/2; 707/3; 707/5
(58) Field of Classification Search ............. 707/2–6
See application file for complete search history.

(56) References Cited

U.S. PATENT DOCUMENTS

| | | | |
|---|---|---|---|
| 5,891,046 A | 4/1999 | Cyrus et al. | |
| 5,999,908 A | 12/1999 | Abelow | |
| 6,477,562 B2 | 11/2002 | Nemirovsky et al. | |
| 6,496,831 B1 | 12/2002 | Baulier et al. | |
| 6,507,840 B1 * | 1/2003 | Ioannidis et al. | 707/4 |
| 6,629,106 B1 | 9/2003 | Narayanaswamy et al. | |
| 6,633,910 B1 | 10/2003 | Rajan et al. | |
| 6,763,353 B2 | 7/2004 | Li et al. | |
| 6,775,658 B1 | 8/2004 | Zothner | |
| 6,941,557 B1 | 9/2005 | Jakobson et al. | |
| 6,954,757 B2 | 10/2005 | Zargham et al. | |
| 7,020,618 B1 | 3/2006 | Ward | |
| 7,028,324 B2 | 4/2006 | Shimizu et al. | |
| 7,065,566 B2 | 6/2006 | Menard et al. | |
| 7,103,556 B2 | 9/2006 | Del Rey et al. | |
| 7,107,224 B1 | 9/2006 | Weller et al. | |
| 2002/0032676 A1 | 3/2002 | Reiner et al. | |
| 2002/0059183 A1 | 5/2002 | Chen | |
| 2002/0062237 A1 | 5/2002 | Matsumoto et al. | |
| 2002/0099578 A1 | 7/2002 | Eicher, Jr. et al. | |
| 2003/0181991 A1 | 9/2003 | Chau et al. | |
| 2003/0236677 A1 | 12/2003 | Casati et al. | |
| 2004/0153329 A1 | 8/2004 | Casati et al. | |
| 2004/0158429 A1 | 8/2004 | Bary et al. | |
| 2004/0172409 A1 | 9/2004 | James | |

(Continued)

OTHER PUBLICATIONS

International Search Report, PCT/US2008/070359, dated Jan. 19, 2009, 3 pages.

(Continued)

Primary Examiner—Debbie M Le
(74) Attorney, Agent, or Firm—Senniger Powers LLP

(57) ABSTRACT

Creating and executing a distributed stream processing operator graph based on a query. The operator graph includes movable stream algebra operators for processing events received from high volume data streams. The operators are partially compiled and distributed to computing devices for completion of the compilation and subsequent execution. During execution, the operators maintain minimal state information associated with received events via an expiration time assigned to each of the event instances. Additional events are generated and aggregated by the operators for communication to a service responsible for the query.

16 Claims, 11 Drawing Sheets

U.S. PATENT DOCUMENTS

| | | | |
|---|---|---|---|
| 2004/0177053 A1 | 9/2004 | Donoho et al. | |
| 2004/0205110 A1 | 10/2004 | Hinshaw | |
| 2004/0220791 A1 | 11/2004 | Lamkin et al. | |
| 2004/0260829 A1 | 12/2004 | Husak et al. | |
| 2006/0265406 A1 | 11/2006 | Chkodrov et al. | |
| 2006/0282695 A1 | 12/2006 | Mital et al. | |
| 2007/0043856 A1 | 2/2007 | Morris et al. | |
| 2008/0114803 A1* | 5/2008 | Chinchwadkar et al. | 707/102 |
| 2008/0120283 A1* | 5/2008 | Liu et al. | 707/4 |
| 2008/0301175 A1* | 12/2008 | Applebaum et al. | 707/102 |

OTHER PUBLICATIONS

Written Opinion, PCT/US2008/070359, dated Jan. 19, 2009, 4 pages.

Barga et al., "Consistent Streaming Through Time: A Vision for Event Stream Processing," Jan. 2007, 11 pages, CIDR 2007, California, USA.

Barga, "CEDR—Complex Event Detection and Response," 2006, 1 page, Microsoft Corporation, USA.

Baulier et al., "A Database System for Real-Time Event Aggregation in Telecommunication," Proceedings of the 24th VLDB Conference, pp. 680-684, 1998, New York, USA.

Barga et al., "Event Correlation and Pattern Detection in CEDR," 4 pages, 2005, 6th International Middleware Conference, California, USA.

Unknown, "C# Version 3.0 Specification," May 2006, 30 pages, Microsoft Corporation, USA.

Arasu et al., "Stream: The Stanford Data Stream Management System," book chapter, Stanford University, 21 pages, USA.

Unknown, "StreamBase Studio," 2007, 5 pages, StreamBase Systems, Inc., USA.

Unknown, "StreamBase Server," 2007, 3 pages, StreamBase Systems, Inc., USA.

Unknown, "StreamSQL," 2007, 2 pages, StreamBase Systems, Inc., USA.

Chandrasekaran, et al., "TelegraphCQ: Continuous Dataflow Processing for an Uncertain World," Proceedings of the 2003 CIDR Conference, 2003, 12 pages, USA.

Dean et al., "MapReduce: Simplified Data Processing on Large Clusters," 2004, 13 pages, Google, Inc., USA.

Isard et al., "Dryad: Distributed Data-Parallel Programs from Sequential Building Blocks," EuroSys '07, 2007, 14 pages, ACM, USA.

Berenson et al., "Microsoft SQL Server Query Processor Internals And Architecture," Jan. 2000, Microsoft SQLServer 7 Technical Article, 16 pages, Microsoft Corporation, USA.

Unknown, "Integration Services Architecture," 2006, 3 pages, Microsoft Corporation, USA.

Unknown, BAM API (BizTalk Server Sample), 2007, 15 pages, Microsoft Corporation, USA.

Milner, "BizTalk Server 2004: A Messaging Engine Overview," May 2005, 33 pages, Microsoft Corporation, USA.

Unknown, "System Center Operations Manager 2007 End to End Service Management Without the Day To Day Drama," 2006, 2 pages, Microsoft Corporation, USA.

Unknown, "BizTalk Server 2006 R2," 1 page, 2006, Microsoft Corporation, USA.

Yoneki et al., Unified Semantics for Event Correlation Over Time and Space in Hybrid Network Environments, 2005, pp. 366-384, Springer-Verlag, U.K.

Unknown, "BizTalk Server Business Rules Framework," White Paper, Dec. 2003, 11 pages, Microsoft Corporation, USA.

* cited by examiner

IMPLEMENTATION OF STREAM ALGEBRA OVER CLASS INSTANCES

BACKGROUND

Many businesses actively monitor data streams and application messages using existing systems to detect business events or situations and take time-critical actions. These existing systems include databases and sensor networks, along with systems for publication-subscription, integration, monitoring, and business intelligence. However, these existing systems are neither scalable nor efficient to handle complex event processing such as required by high-volume continuous data streams.

Some existing systems are centered around a pull model in which data is first stored and then queried. In such systems, all incoming data is first stored in memory (e.g., local trace files on disk) which reduces the performance (e.g., only a few thousand events per second may be processed). Such existing systems provide no considerations for data from different sources arriving with different latency.

Other existing systems use stateless filters to process streams of data. In such systems, the filters operate on each message from the data stream but do not store any information from one message to the next. As such, these systems cannot be used to make conclusions about a particular sequence of received messages.

Some existing systems rely on relational algebra to mathematically describe data manipulation. The Structured Query Language (SQL), for example, is a higher-level form of relational algebra implemented in a pull model. In such a model, a query is translated into relational algebra operators. A SQL optimizer may re-order the operators using different permutations to identify a semantically equivalent expression that produces the desired result with the least processing. This expression is referred to as a query execution plan. Incoming data is processed according to this query execution plan.

Functional operators implementing relational algebra, however, are not suited to manipulating high-volume, continuous stream data in real-time. Additionally, the semantics of SQL queries over streaming data is vague. By first storing all the data, processing performance of SQL queries is limited due to the disk input/output of the hardware storing the data to be queried. Additionally, SQL installations cannot be cascaded for distributed processing. This results in a system that cannot operate on high-volume data streams in real-time.

SUMMARY

Embodiments of the invention include a general purpose stream processor. In an embodiment, the invention builds, responsive to a query, a distributed operator graph or execution plan with stream algebra operators for processing events received from one or more data streams. The operators are transmitted to distributed computing devices as expressions for compilation and execution by the distributed computing devices to find correlations between events as a function of the query prior to expiration of the events.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Aspects of the invention process high-volume continuous streams of data using a stream algebra to represent and manipulate events. In an embodiment, the invention includes one or more movable or distributed stream algebra operators for use in building distributed stream-processing operator graphs, execution plans, execution plan graphs, or the like. The operators process class instances (e.g., events) according to the operator graphs. The class instances become messages when sent over a communications network. Aspects of the invention operate on a platform for massive volume, distributed processing of event and message streams to support real-time analysis of the event and message streams. For example, users may wish to monitor low level streams of data about point of sale transactions or the addition of goods into a supply chain to make high-level inferences such as the detection of fraud.

Figure 1:
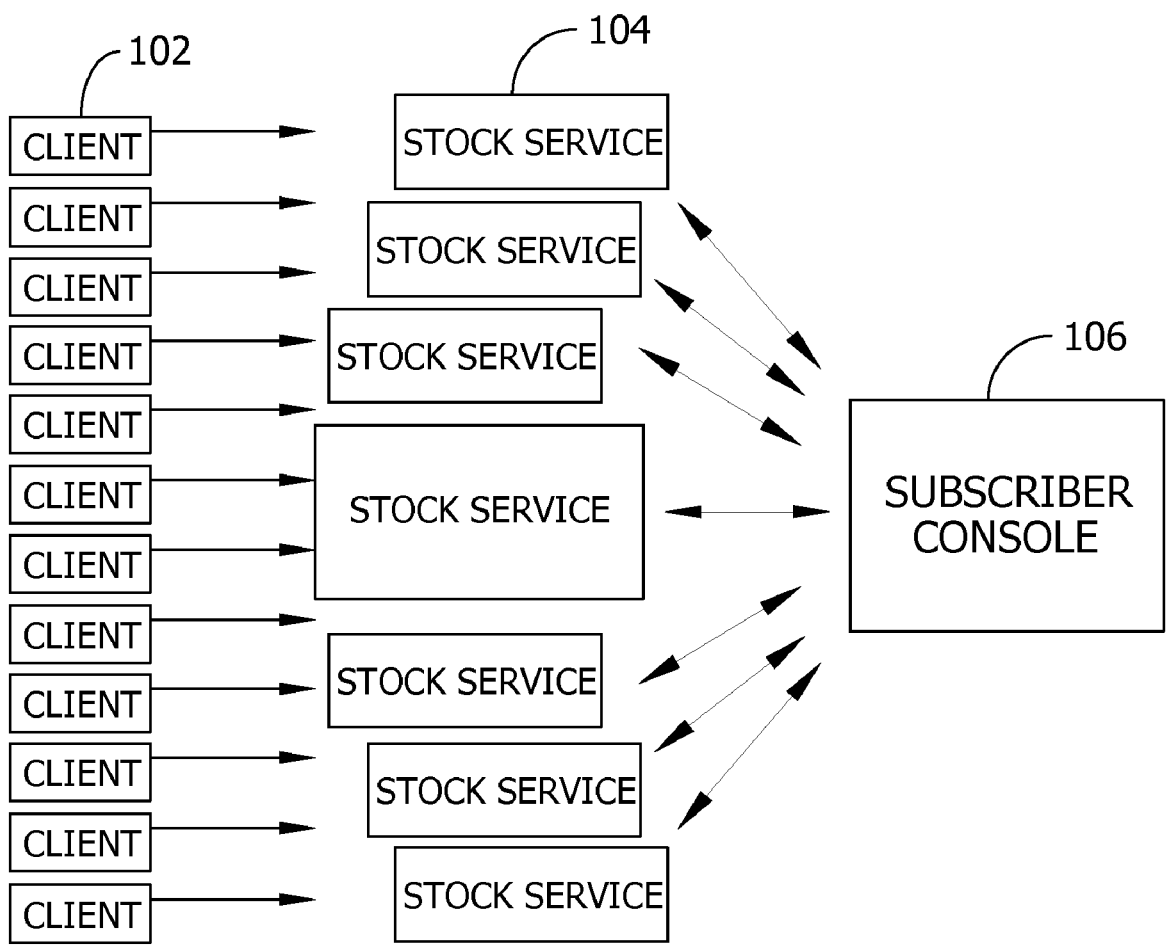
FIG. 1 is an illustration of an exemplary scenario in which embodiments of the invention analyze data from a stock service.

In another example, FIG. 1 shows an exemplary scenario in which embodiments of the invention analyze buy and sell orders in a stock service 104 for compliance with service level agreements (SLAs). SLAs are known in the art, and generally refer to guarantees made by a service provider to process events within a particular time period. In the example of FIG. 1, the stock service 104 is deployed on a web farm, or other plurality of computing devices, to track an incoming high volume stream of events from clients 102. The stock service 104 has two methods: "GetQuote" and "BuyStock". The user of a subscriber console 106 wishes to monitor an SLA by analyzing the average response time per method. Output of the analysis may include statistics such as shown in Table 1 below.

TABLE 1

Exemplary Output from Monitoring Application.

| Method | Average Duration |
|---|---|
| BuyStock | 2.7 seconds |
| GetQuote | 1.3 seconds |

In an embodiment, the stream algebra operators include funclets (e.g., small functions or classes such as in the C# programming language) which consume and produce streams of classes. While aspects of the invention may be described with reference to version 3.0 of the C# programming language, embodiments of the invention are operable with any current or future programming language that has support for the features described herein such as expression and query. Similarly, while aspects of the invention may be described with reference to the Microsoft Corp. brand web services technology .NET, embodiments of the invention are operable with any web service information technology architecture. For example, embodiments of the invention may be implemented in lower levels of the protocol stack, unmanaged code, embedded devices or hardware, and the like.

Embodiments of the invention react to events as the events occur, handle events from different sources arriving with different latency and clock offsets, and efficiently maintain a state of the transformations by discarding information that does not need to be stored thus allowing for correct semantics and continuous operation at very high volumes. Aspects of the invention represent an extension of relational algebra with time to process continuous, high-volume streams of data with movable operators and minimal state. The operators in the graph may share common subexpressions, may be re-ordered for efficiency, and may be placed on distributed machines (e.g., configuring the graph). The output is independent of internal wire latencies and order of processing. In an embodiment, the operators are extremely efficient at runtime because they get compiled into intermediate language (IL) code. In an embodiment, only the state necessary to provide causality reasoning or query-specific data is maintained to enable the system to process a sequence of messages.

Data Streams and Events

In an embodiment, a data stream is modeled as a time varying relation. Each tuple in the relation is an event and has an identifier (ID). Each tuple also has a validity interval which indicates the range of time when the tuple is valid from an event provider's perspective. Given the interval representation of each event, it is possible to issue the following continuous query: "at each time instance t, return all tuples that are still valid at t." After an event initially appears in the stream, its validity interval may be changed by the event provider.

Figure 2:
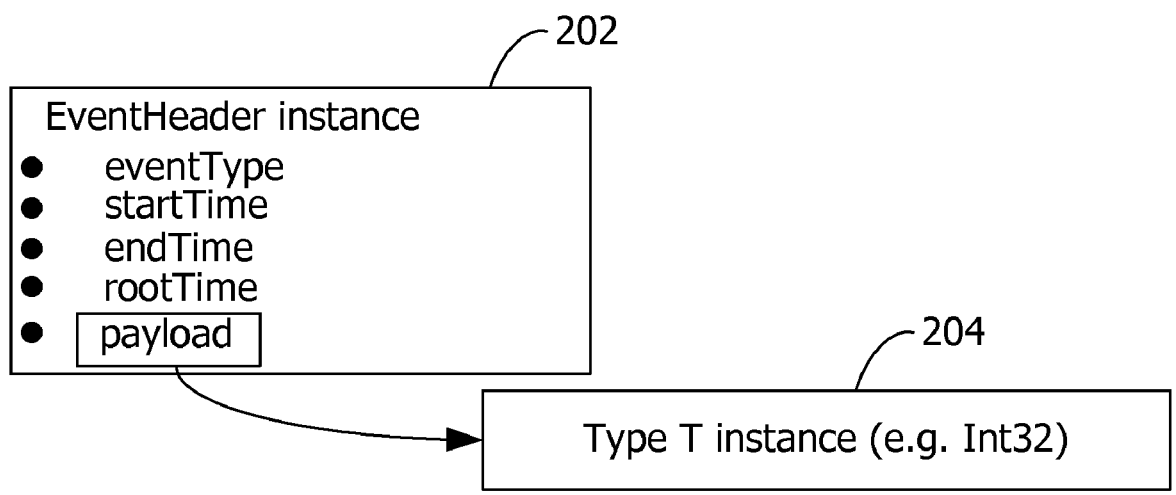
FIG. 2 is an exemplary block diagram illustrating an instance of an event.

Referring next to FIG. 2, a block diagram illustrates an exemplary instance 202 of an event in an embodiment of the invention. The instance 202 includes a data structure having a header and a payload. The data structure illustrated in FIG. 2 is used to represent both a single event and a plurality of events (e.g., an aggregated event). In an embodiment, the EventHeader instance 202 limits the lifetime of an instance 204 of type T. Further, instances of T (e.g., separate events) are immutable. For example, if the same instance 204 of Int32 in this example is relevant to two queries, two EventHeader instances pointing to the same instance 204 of T are used. In this manner, different entities (e.g., subscribers) enforce different lifetimes as part of their queries (e.g., different moving windows).

In an embodiment, events inherit from the following header:

```
public enum EventType : short {Insert, Delete, ClockIncrement}
   [DataContract]
public abstract class EventHeader
{
    EventType eventType;
    DateTime startValidTime;
    DateTime endValidTime;
    DateTime rootTime;
    [DataMember] public EventType EventType  {get; set;  }
    [DataMember] public DateTime StartValidTime  {get; set;  }
    [DataMember] public DateTime EndValidTime  {get; set;  }
    [DataMember] public DateTime RootTime  {get; set;  }
}
```

The properties in the exemplary data structure corresponding to an event are shown in Table 2 below.

TABLE 2

Meaning of Exemplary Properties Associated with an Event.

| Property | Meaning |
|---|---|
| EventType | One of three exemplary types: Insert, Delete, and Clock Increment |
| StartValidTime | Occurrence time of the event (e.g., Vs as described above) |
| EndValidTime | Expiration time of the event (e.g., Ve as described above). For input events this is usually +∞, which means that the source does not want the events to expire. When the subscriber registers a particular query, the semantics determine the expiry policy (e.g., a moving window). Note that the event might expire in one subscriber's query yet live on in another. |
| RootTime | This is the start time (e.g., Vs) of the earliest event contributing to the current event. |

An insert event means that the distributed system has learned something new. An example is an offer to buy or sell stock at given limit price. StartValidTime represents the time of the occurrence of the event (e.g., the time the order was created). EndValidTime represents an expiration time for all consequences of the event. Once the time moves past EndValidTime, the system discards all the state associated with or resulting from this event. This feature, which enables the system to automatically forget data, allows the system to achieve sustainable performance on continuous streams.

A delete event means that something the system knew about the external world is no longer true. For example, if the order was created at 10:00 am and was valid until 11:00 am, a delete event with StartValidTime=10:30 am and RootTime=10:00 am tells the system that the validity interval of the order was shortened from one hour to 30 minutes. The delete event effectively deletes part of the validity interval of the original event. Delete events shorten the original validity interval. Once the validity interval is shortened, the event may be discarded from the state of the operators depending on the current time.

A clock increment event is fired when the application time moves forward. This means that the source host executable guarantees that there will be no more events with earlier StartTime than the StartTime of the clock increment event. This is used by the operators to discard unnecessary state and detect timeouts. Clock Increment events may be fired at regular intervals much like heartbeat events thus moving time forward, unblocking events from the state of the operators, and causing expired events to be discarded.

The payload is added to the insert and delete events by defining an Event<T> such as shown below.

```
[DataContract]
public class Event<T> : EventHeader
{
    T payload;
    [DataMember]
    public T Payload
    {
        get { return payload; }
        set { payload = value; }
    }
}
```

Distributed Placement of Operators

Figure 3:
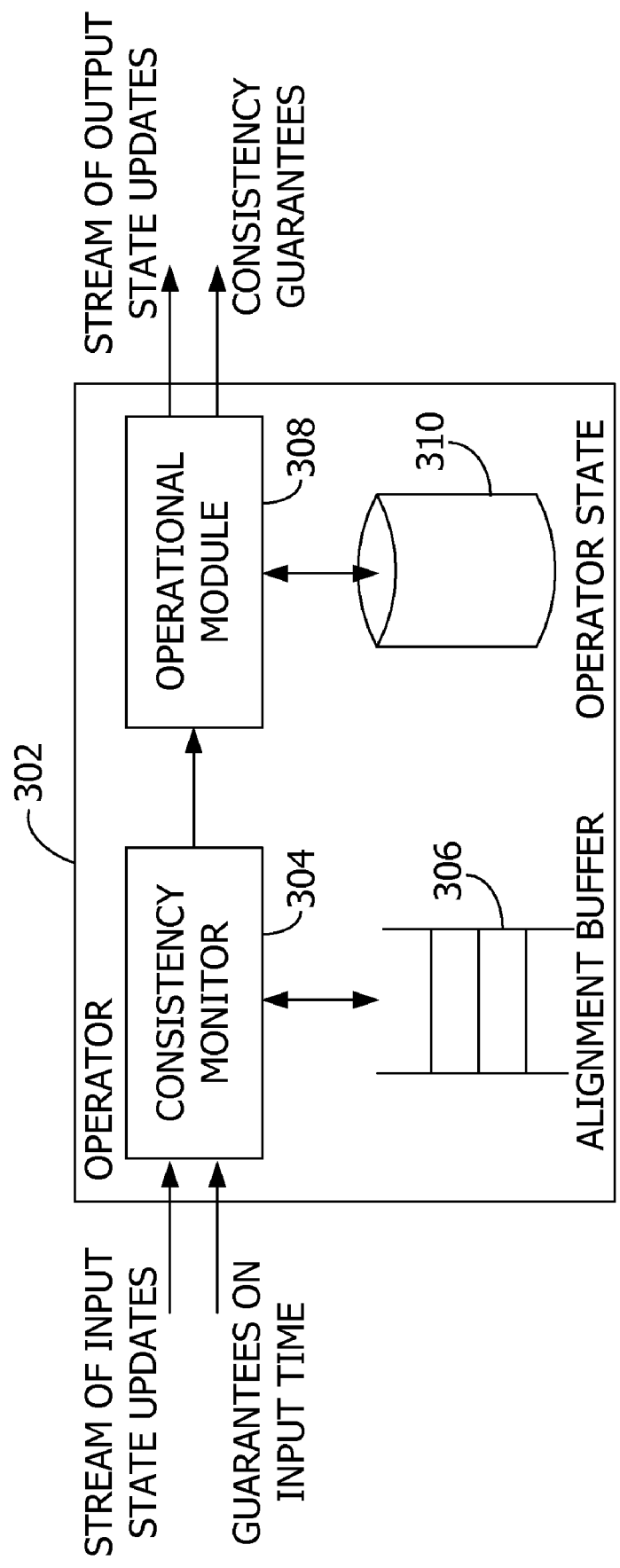
FIG. 3 is an exemplary block diagram illustrating a stream algebra operator.

Operators include small functions that process streams of events. A set of composable operators are stored in a memory area and combined to form a pipelined query execution plan or other distributed stream processing operator graph. Each of the operators is adapted to perform one or more functions on data events from an event stream. The query semantics are defined on the information obtained from event providers. An exemplary operator 302 is shown in FIG. 3. A consistency monitor 304 decides whether to block the input stream in an alignment buffer 306 until output may be produced which upholds the desired level of consistency. An operational module 308 computes the output stream based on incoming tuples and current operator state 310.

Figure 4A:
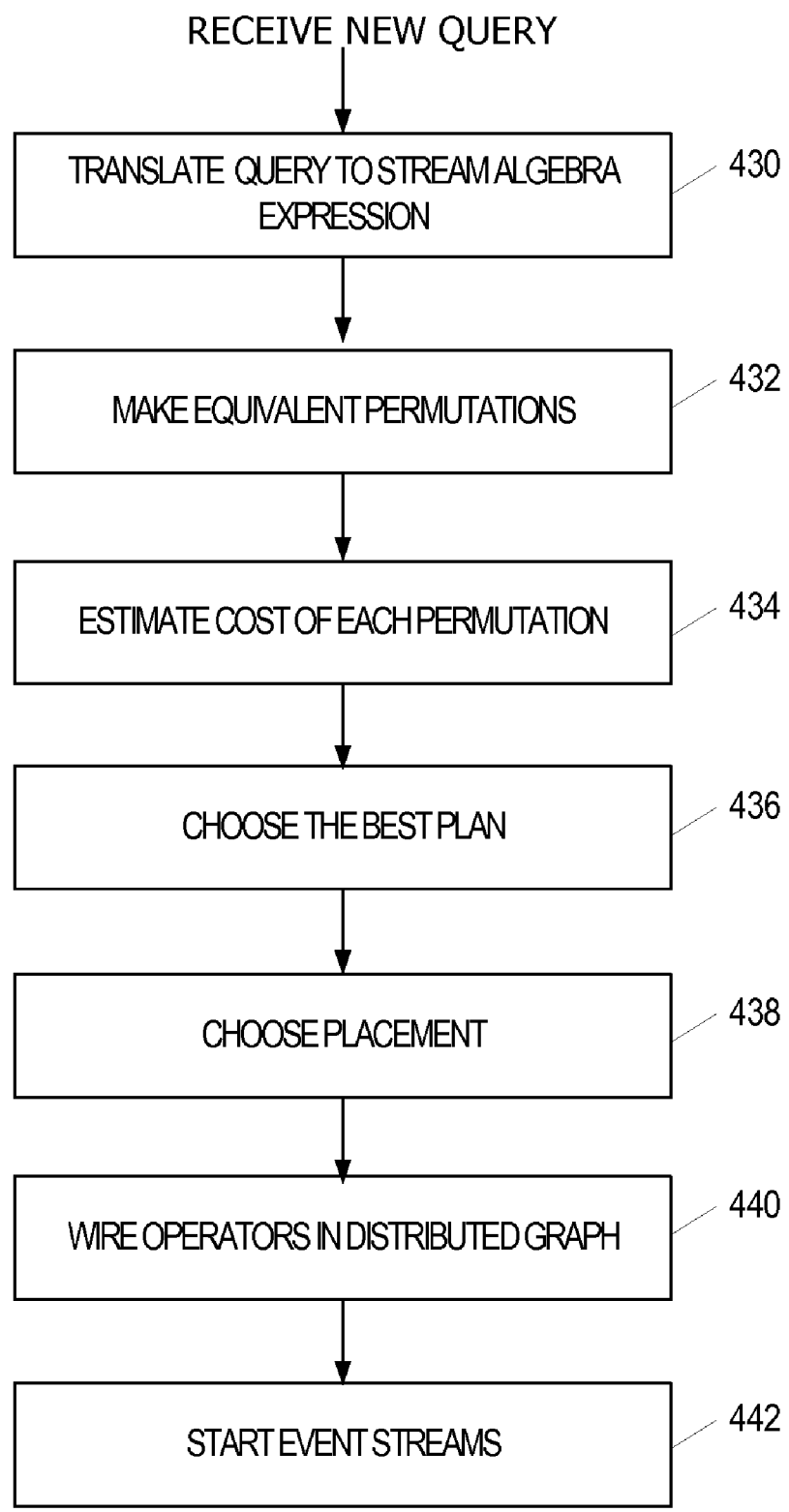
FIG. 4A is an exemplary flow chart illustrating the use of operators for distributed stream processing.

Referring next to FIG. 4A, a flow chart illustrates the use of operators for distributed stream processing. The language used to describe FIG. 4A may differ from existing query languages to express temporal queries on streams. At 430, a received query is compiled into stream algebra. The output of operation 430 is a stream algebra expression which might be sub-optimal and does not specify the placement of operators. Referred to as a "plan straw-man," the output of operation 430 is input to operation 432. At 432, equivalent permutations are made without changing the semantics of the expression by using the stream algebra reorder the operators. The cost of each expression from the permutation is estimated at 434 and the best, most optimal plan is chosen at 436. For example, if there is an operationally expensive filter F1 followed by an operationally inexpensive filter F2, the filters are reordered as F2 followed by F1 to reduce the amount of data on which F2 operates. The placement of the operators is chosen at 438. In 438, the plan is not changed anymore, but further optimizations may be made such as pushing filters closer to data sources. The operators from the optimized plan are instantiated on distributed computed devices and connected or "wired" together at 440 to implement the optimized execution plan. Event streams begin at 442.

Figure 4B:
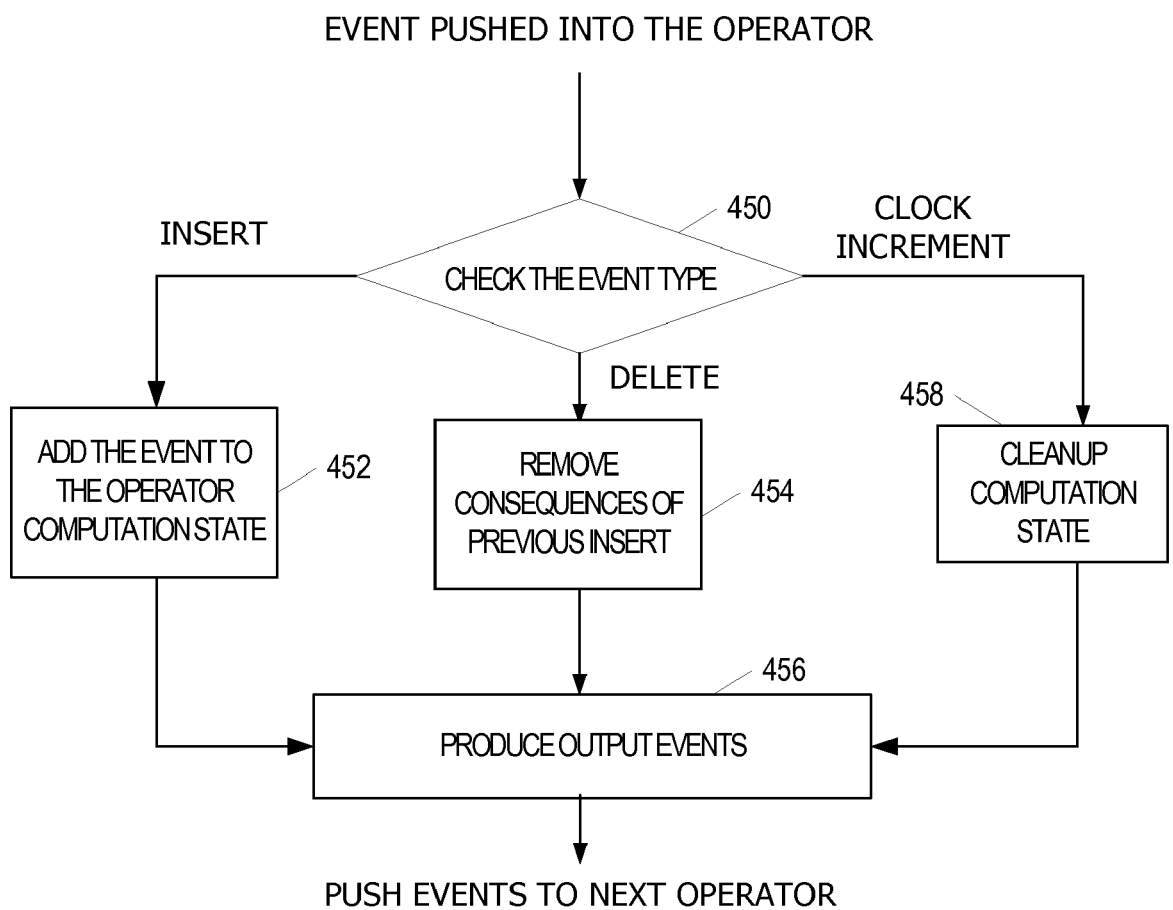
FIG. 4B is an exemplary flow chart illustrating the processing performed by stateful operators.

Referring next to FIG. 4B, an exemplary process performed by stateful operators is shown. At 450, the type of an event incoming to an operator is checked. Exemplary types include Insert, Delete or Clock Increment. Insert events result in adding information to the operator computation state at 452. For example, an aggregation operator increases its current value. At 454, Delete events cause removal of the consequences of previous Insert events. For example, an aggregation operator decreases its current value when receiving a Delete Event. After the changes are made to the operator computation state, the operator executes an algorithm that produces one or more output events at 456. For example, a join operator produces an output event for each match of the input event.

If the event is Clock Increment, the operator cleans its computation state at 458 and determines whether output events should be fired. For example, an anti-semi-join operator fires an output event at 456 indicating non-occurrence of matching event in given time window. The Clock Increment event is also sent as output to let downstream operators (e.g., subsequent operators in the execution plan) clean up their computation state.

Figure 4C:
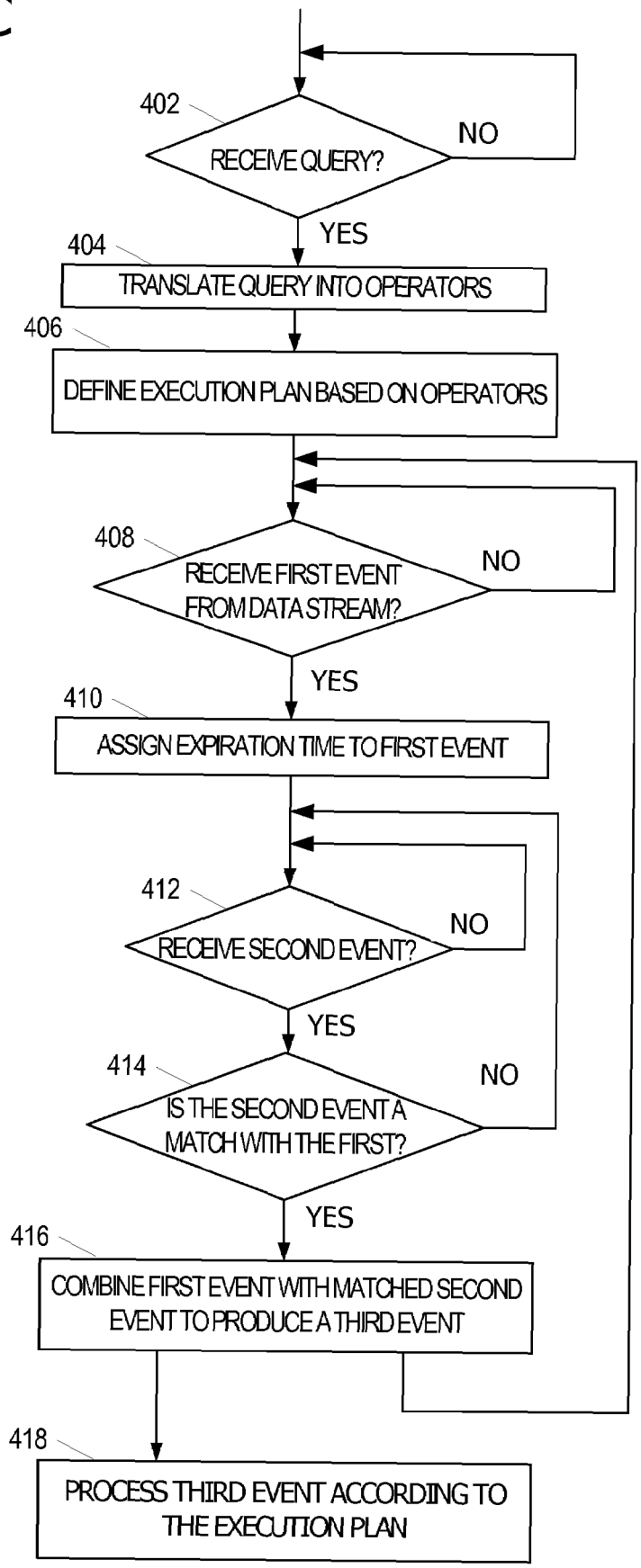
FIG. 4C is an exemplary flow chart illustrating the definition and execution of operators in an execution plan while maintaining minimal state.

In another form, a flow chart such as shown in FIG. 4C illustrates the definition and execution of operators in an execution plan for processing high-volume continuous streams of data while maintaining minimal state information associated with the data. The method illustrated in FIG. 4C includes receiving at 402 a query comprising query data and operator semantics. The query represents a request for data. The received query is translated at 404 into a plurality of stream algebra operators in an execution plan defined at 406 to represent a data flow. The method loops at 408 until a first event is received from the data stream (e.g., a first data stream). An expiration time is assigned to the received first event at 410. The value for the expiration time is a function of the query data. For example, the expiration time may be assigned, or subsequently adjusted, to minimize the duration of the existence of the first event or minimize the quantity of state information maintained by the operators. The method continues to receive events, such as a second event (e.g., from a second data stream) at 412.

One or more of the stream algebra operators are executed at 414 according to the defined execution plan and as a function of the operator semantics from the received query to find a match between the first event and the second event prior to expiration of the first event based on the assigned expiration time associated with the first event. If the second event does not match the first event at 414, the method discards the second event and continues to wait until another second event is received at 412. If the second event matches the first event at 414, the first and second events are combined at 416 to produce a third event which is then processed at 418 according to the remainder of the execution plan.

Figure 5:
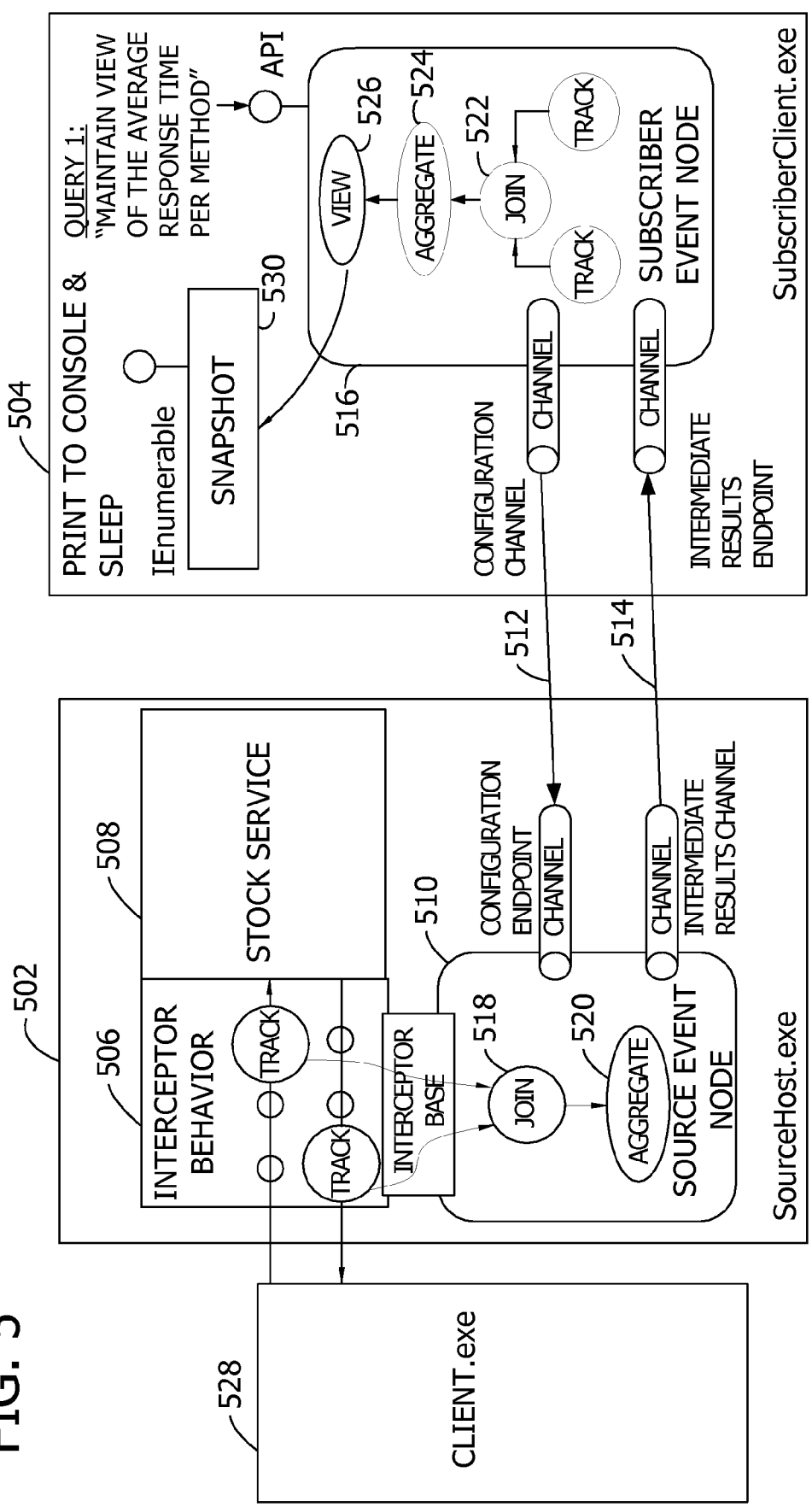
FIG. 5 is an exemplary block diagram illustrating the distributed placement of operators.

Referring next to FIG. 5, an exemplary block diagram illustrates the distributed placement of operators. An administrator or other user with install privileges installs software to intercept or track data streams associated with, for example, a stock service 508 on a computing device. In an embodiment, the software is referred to as Interceptor Behavior 506 and may be implemented as a dynamically linked library or as a library or set of C# classes. The stock service 508 is configured to communicate with the software. Embodiments of the invention are operable with any means for obtaining input data from an event stream such as provided by the stock service 508. A source host executable (sourcehost.exe) 502 instantiates the interceptor behavior software 506 and a source event node 510. The source event node 510 is a runtime executable associated with the operators. In an embodiment, there is a plurality (e.g., hundreds) of computing devices executing a copy of the source host executable 502. The source event node 510 opens a configuration channel 512 and endpoint or other communication means to receive configuration data such as an execution plan indicating which operators to instantiate.

A user, process, or other entity instantiates a subscriber client executable (subscriberclient.exe) 504. The subscriber client executable 504 is responsible for responding to the query. The subscriber client executable 504 instantiates a subscriber event node 516 and submits configuration data (e.g., query information) to the source event node 502. For example, the query information may indicate that the average response time per method is desired.

A compiler translates the high-level representation of the query into an execution plan. The compiler may be associated with or otherwise accessible to the subscriber client executable 504. In an embodiment, the execution plan corresponding to the desired query tracks the timestamps before and after execution of each method of interest, then calculates the individual request duration (e.g., Join 522) and maintains an aggregate view 526 via an aggregate operator 524. The subscriber client executable 504 serializes a portion of the execution plan for transmittal to the source host executable 502 via the configuration channel 512 and endpoint or other communication means. The subscriber event node 516 completes implementation of the execution plan by using operators, in this particular example, for performing aggregation and view maintenance. The subscriber event node 516 also exposes a channel 514 and endpoint or establishes another communication with the source event node 510 to receive intermediate results from the source event node 510 once the source event node 510 begins generating data for the subscriber event node 516.

In an embodiment (not shown), the subscriber client executable 504 has configuration channels open with a plurality of source host executables 502 (e.g., each instance of the stock service 508). In such an embodiment, the subscriber client executable 504 sends the serialized portion of the execution plan to each of the plurality of source host executables 502 by multi-casting. Alternatively or in addition, the subscriber client executable 504 configures each of the plurality of source host executables 502 individually.

Upon receiving the execution plan, the source event node 510 associated with the interceptor behavior software 506 creates or instantiates operators to implement the portion of the execution plan received from the subscriber client executable 504. In the example of FIG. 5, the source host executable 502 creates an aggregation operator 520 and a join operator 518 and connects these operators 518, 520 to the interception points provided by the interceptor behavior software 506.

In another embodiment (not shown), an operator currently being executed may be re-distributed by pausing execution of the operator, storing state information maintained by the operator, and sending the operator logic and stored state information to another computing device or host for execution.

At this point, the system as illustrated in FIG. 5 is ready to process input data.

In operation, a client executable (client.exe) 528 sends requests to the source host executable 502 (e.g., methods or services such as GetQuote and BuyStock). For each request, a timestamp (e.g., DateTime.UtcNow) is generated before the service is executed. The timestamp is encapsulated into an event (e.g., a first event) that is pushed into the join operator 518. The event is inserted in a corresponding data structure maintained by the join operator 518 (e.g., a hash table). The join operator 518 does not produce output at this point because there is nothing from the other input to the join operator 518 (e.g., a response from the stock service 508).

The stock service 508 executes the requested method or service. Before a response is sent from the stock service 508, a timestamp is generated and encapsulated into an event (e.g., a second event). To ensure the semantics are the same independent of network latencies, only timestamps given by the source event node 510 are used. The second event is pushed into the join operator 518. If this event matches the event previously pushed into the join operator 518 (e.g., the second event matches the first event), the join operator 518 produces an output event (e.g., a third event) which is pushed in the aggregate operator 520. The aggregate operator 520 in this example is configured to accumulate totals over a given interval (e.g., one per minute) for the particular source host executable 502 and then produce a summary message for transmission to the subscriber client executable 504 over the channel 514 for intermediate results. An exemplary summary message is shown in Table 1 above.

The subscriber event node 516 receives the summary message and pushes the message through the rest of the execution plan. In an embodiment in which the subscriber event node 516 communicates with a plurality of source host executables 502, the subscriber event node 516 may be said to perform global aggregation while the source event node 510 is said to perform local aggregation. Local aggregation is operationally "cheaper" than sending each event to the subscriber client executable 504. In this manner, the source event nodes 510 act as computed performance counters without code modification.

In the example of FIG. 5, the query results in two outputs. One output corresponds to a view that is maintained (e.g., a client application runs a loop which takes a snapshot 530 from the view each second and prints it on a console for a user to view). In another output, the data is filtered to show only average durations of any method that exceed a given threshold (e.g., given from the user, predefined, etc.). For example, an email notification may be generated for any violation of a SLA.

From a user perspective, the user installed the interceptor behavior software 506, changed the configuration of the stock service 508 to communicate through the interceptor behavior software 506, and formulated a query. In contrast with existing systems, the user did not have to generate any software code, did not have to use a database, and did not have to access log files. The system illustrated in FIG. 5 is flexible such that new operator implementations may be easy added to the source event node 510.

Figure 6:
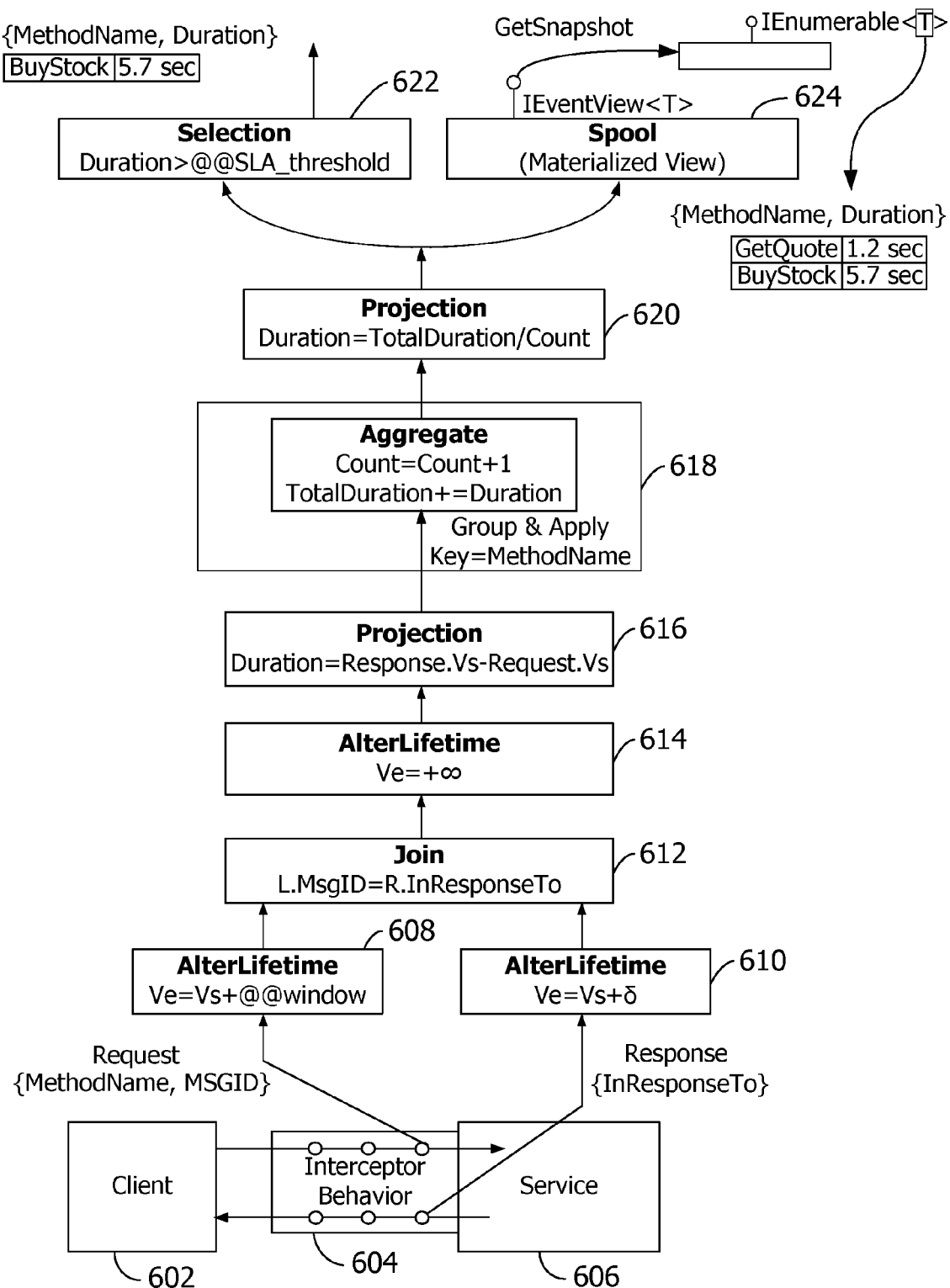
FIG. 6 is a block diagram illustrating an exemplary execution plan for analyzing compliance with a service level agreement (SLA).

Referring next to FIG. 6, a block diagram illustrates an exemplary execution plan for analyzing compliance with an SLA. The exemplary execution plan generally corresponds with the block diagram and associated description of FIG. 5. For example, client 602, interceptor behavior software 604, and service 606 in FIG. 6 correspond to client.exe 528, interceptor behavior software 506, and stock service 508 in FIG. 5. In operation, a "Request" input stream has payload data schema {Guid MessageID, string MethodName}. Each event also has a system header that includes the timestamp that was taken by the interceptor 604 using, for example, DateTime.UtcNow. Each event from this stream is pushed through an operator (e.g., alter lifetime operator 608) that assigns an expiration time to each event so that the next join operator 612 in the execution plan only maintains a moving window of events on the stream. In this example, @@window is a configurable parameter on the query and has the meaning of timeout to receive the second event.

The "Response" input stream has payload schema {Guid InResponseTo}. Its lifetime is set to δ (one chronon length) via an alter lifetime operator 610 which instructs the following operators in the execution plan not to store this event at all. Both streams are fed to the next join operator 612. Once a Request event matches one of the Response events, a third event is created and assigned an expiration time via an alter lifetime operator 614. The duration for an individual request may be calculated via the projection operator 616.

In an embodiment (not shown), the projection operator 616 is bundled with the join operator 612 for simplicity. Because the projection operator 616 does not change the validity interval of the event, the projection operator 616 may be moved before the AlterLifetime operator 614 and the result is the same.

A group apply operator 618 partitions the stream on MethodName. This means that an instance of the internal graph of operators is created for each unique name. All subsequent events for this name will be sent to the same branch. Aggregation is used in each branch to calculate the total time and count for each distinct name.

Another projection operator 620 calculates an average. The stream is forked for two purposes: the selection operator 622 detects methods that are slow on average and produce notifications while the spool operator 624 maintains a materialized view from which the monitoring application takes snapshots representing the data as of a particular moment in time.

Exemplary Implementation of an Operator Graph

Figure 7:
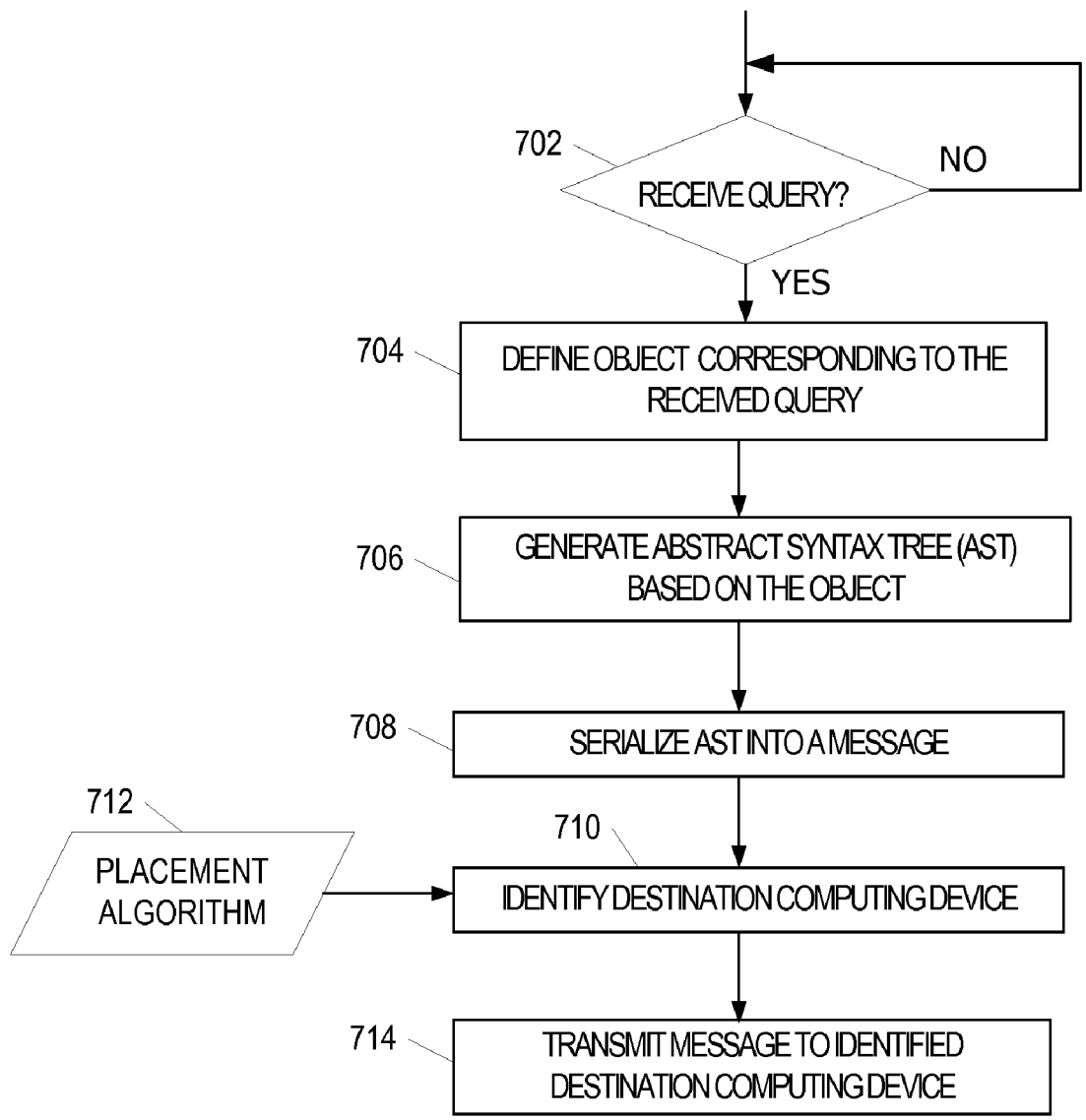
FIG. 7 is an exemplary flow chart illustrating creation and distribution of an operator.

Referring next to FIG. 7, an exemplary flow chart illustrates creation and distribution of operators using an abstract syntax tree (AST) to build an operator graph. The method loops at 702 until a query is received (e.g., by a subscriber computing device implementing a service). An object is defined at 704 to include an expression representing one or more functions representing the operator graph or a portion thereof based on the received query. The functions are to be performed on the data events from the event stream. The AST is generated at 706 based on the defined object. The AST is serialized into a message at 708. The message corresponds to one or more operators. A destination computing device is identified at 710 to host and execute the corresponding operators. For example, the destination computing device may be identified at 710 as a function of a placement algorithm 712. In an embodiment, the placement algorithm factors in network bandwidth and latency in addition to other types of costs such as disk input/output speed, processor speed, and memory availability. In another example, the destination computing device is identified as a function of the execution plan.

The message is transmitted to the identified destination computing device at 714 to implement the portion of the operator graph represented by the message. In particular, the destination computing device compiles the expression from the AST from the message into executable code representing the operators. The executable code, when executed by the destination computing device, operates on the data events received from the event stream. In an embodiment, aggregated events are produced by the destination computing device and communicated to the subscriber computing device. The subscriber computing device processes the received aggregated events according to the remainder or other portion of the operator graph.

Embodiments of the invention are operable with representations of expressions, logic, instructions, or commands other than the AST. For example, embodiments of the invention are operable with any directed tree, parse tree, or other framework for representing expressions.

Figure 8:
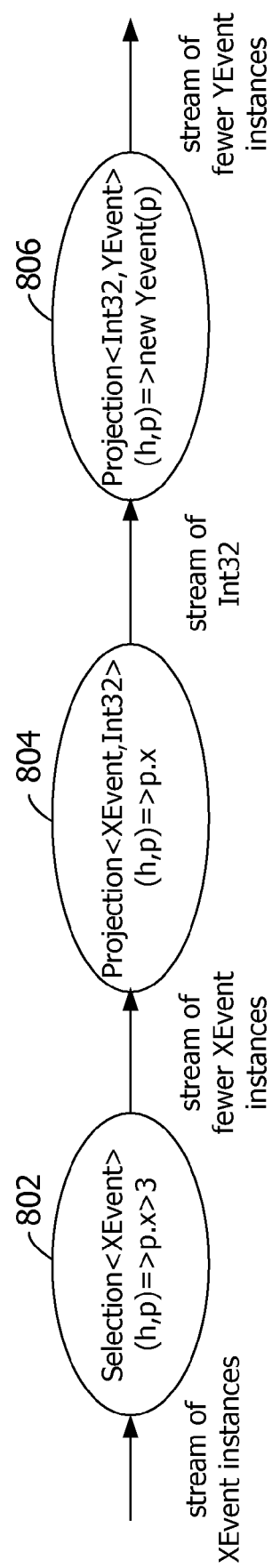
FIG. 8 is a block diagram of an exemplary operator graph.

Referring next to FIG. 8, a block diagram illustrates an exemplary operator graph. On the left side of FIG. 8, a stream of XEvent instances is input. In memory, the XEvent instances are blocks of 8 bytes each: 4 for a type system pointer and 4 for the member Int32. Each instance of XEvent has an accompanying instance of EventHeader. The Selection<XEvent>operator 802 is a filter that does not change the type. The output stream from this operator includes fewer XEvent instances (e.g., only the ones with x>3 where x is the member of incoming XEvent). The Selection operator 802 propagates the EventHeaders unchanged in an embodiment. Subsequent projection operators 804, 806 result in a stream of fewer YEvent instances.

Exemplary class data structures for the XEvent instances and the YEvent instances are shown below.

```
public class XEvent
{
    public int x;
    public XEvent (int x);
    {
        this.x = x;
    }
}
public class YEvent
{
    public int y;
    public YEvent (int y);
    {
        this.y = y;
    }
}
```

The operator graph illustrated in FIG. 8 is built using a selection description such as illustrated below.

```
[DataContract]
public class SelectionDescription<T>
{
    public__LambdaExpression filterExpression;
    public SelectionDescription(
        Expression<Func<T, bool>> filterExpression)
    {
        this.filterExpression = new__LambdaExpression (filterExpression);
    }
}
```

The selection description may be created as shown below.

```
SelectionDescription<XEvent> description=new
    SelectionDescription<XEvent>((h,p)=>p.x>3);
```

Figure 9:
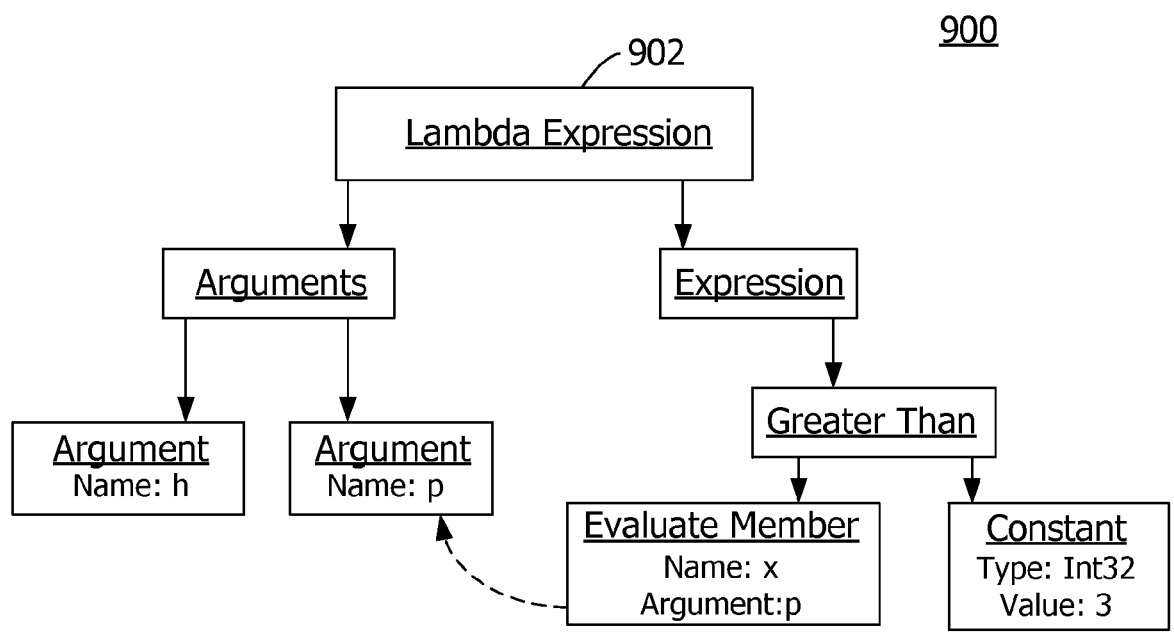
FIG. 9 is an exemplary block diagram of an abstract syntax tree.

In this example, (h,p)=>p.x represents a lambda Expression such as in the C# compiler. In this example, h means the EventHeader and p addresses the payload (e.g., XEvent). The lambda expression means the following:

The following is partially compiled code that depends on the placeholders (h) and (p): return p.x A compiler parses the text of the SelectionDescription including the lambda expression, checks the syntax and types of all involved arguments, generates an abstract syntax tree, and calls the SelectionDescription constructor with the generated abstract syntax tree. The exemplary block diagram of FIG. 9 illustrates an abstract syntax tree 900 corresponding to the lambda expression 902 described above.

The compiler produces a partial compilation because the compiler does not generate intermediate language or other assembly language code. Rather, the compiler passes the abstract syntax tree 900 as an object of type expression into the constructor of SelectionDescription. This information is sent to the destination computing device, which completes the compilation of the lambda expression 902 into executable code.

The abstract syntax tree 900, as known in the art, is a representation of one or more functions. As an example, the abstract syntax tree 900 may be described as a directed node tree where leaf nodes represent operands and the other nodes represent operators. The information from the abstract syntax tree 900 is serialized into a message (e.g., a data contract) and sent to a destination computing device for execution (e.g., by a source host executable). In an embodiment, wrappers are provided such as in the _LambdaExpression portion of the code example above enable serialization.

After the information is received on the destination computing device, the runtime operator Selection<T> is instantiated in this example such as shown below.

```
public class Selection<T>
{
    Func<EventHeader,T,bool> filter;
    public void Selection(SelectionDescription description)
    {
        filter = description.filterExpression.Compile<
Func<EventHeader,T,bool>>( );
    }
    public void ProcessEvent(Event<T> evt)
    {
        if (filter(evt, evt.Payload))
        {
            OutputEvent(evt);
        }
    }
}
```

In this example, the destination computing device finishes compilation by having a constructor take the received description and compile the expression therein into an intermediate language code (IL) fragment or a fragment of another low-level assembly language or other executable code. The IL fragment becomes assembly language which is executed very efficiently on the small in-memory object XEvent.

In embodiments of the invention, each operator is reduced to a small set of assembly instructions. This allows for exceptional performance on the order of millions of events processed per second through stateless operators. In an embodiment, each operator represents a thin wrapper around an expression plus small data structures to store the state in a way that is very efficient.

Exemplary Operators

Table 4 below lists exemplary operators for use in embodiments of the invention. Embodiments of the invention, however, are not limited to the operators listed below. Rather, aspects of the invention support other operators and code provided by a user.

TABLE 4

Exemplary Stream Algebra Operators.

| Operator | Message Semantics | Argument Expressions |
|---|---|---|
| Selection<T> | Filter | $P: T \rightarrow bool$ |
| Projection<I,O> | Transform | $T: I \rightarrow O$ |
| Union<T> | Multiplexing | |
| Join<L,R> | Correlation | $P: \{L,R\} \rightarrow bool$ |
| Difference<L,R> | Detecting non-occurrence (symmetric) | $P: \{L,R\} \rightarrow bool$ |
| Anti-SemiJoin<L,R> | Detecting non-occurrence (event on L but not on R) | $P: \{L,R\} \rightarrow bool$ |
| Aggregate<T> | Aggregation | $F_a: \{T,T\} \rightarrow T$ |
| TopN<T,K> | Dynamic TopN collection | $F_k: T \rightarrow K; Top(N)$ |
| AlterLifetime<T> | Setting Vs and Ve | $F_{Vs}: T \rightarrow DateTime;$ $F_D: T \rightarrow TimeSpan$ |
| Align<T1,...Tn> | Time-Alignment | |
| GroupApply<I,K,O> | Map-Reduce | $F_k: I \rightarrow K,$ Apply expression: $I \rightarrow O$ |
| Spool<T> | Snapshot Accumulation | Policy Y |

In Table 4, the Selection, Projection, Union, and Alterlifetime operators are stateless. The Join, Difference, Anti-Semi-Join, Aggregate, TopN, Align, GroupApply, and Spool operators are stateful.

The operators in Table 4 above discard unnecessary state in response to a clock increment event, and consider validity intervals of the events (e.g., a join operator will join two events only if the intersection of their validity intervals is a non-empty interval. For example, the join operator takes first and second streams of different types, maintains a hash table for each stream, and evaluates a binary expression of type Expression<Func<First,Second,bool>> to find the matches.

Some of the exemplary operators do not completely dissolve. Rather, they also have state-collections such as hash tables. Those collections require memory allocation and searches, so their performance is on the order of hundreds of thousands processed events per second.

Other exemplary operators are referred to as the alter lifetime operator, the align operator, and the group apply operator. The alter lifetime operator is a stateless operator that changes the timestamps. The alter lifetime operator is used, for example, to assign expiration times to the events. The align operator queues the events from multiple streams and releases them in the order of, for example, the StartValidTime value. The group apply operator separates the group semantics from the aggregation. For example, the group apply operator forks a stream on a given partitioning key and executes a graph of operations for each partition.

Exemplary Operating Environment

Any computing device having a processor and access to memory is suitable for use in the other figures illustrated and described herein. The computing device may operate in a networked environment using logical connections to one or more remote computing devices. The logical connections include a local area network (LAN) or a wide area network (WAN), but may also include other networks. LAN and/or WAN may be a wired network, a wireless network, a combination thereof, and so on.

The computing device typically has at least some form of computer readable media. Computer readable media, which include both volatile and nonvolatile media, removable and non-removable media, may be any available medium that may be accessed by the computing device. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computing device. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

Although described in connection with an exemplary computing system environment, including the computing device, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The computer-executable instructions and components described and illustrated herein constitute exemplary means for building the distributed operator graph, exemplary means for generating the expression, and exemplary means for identifying the one or more destination computing devices to host the stream algebra operators.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions executed by one or more computing devices. The computer-executable instructions may be organized into one or more computer-executable components or modules. Generally, program modules include, but are not limited to, routines, programs, objects, components, and data structures that perform particular tasks or implement particular abstract data types. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein. Aspects of the invention may also be practiced in distributed computing environments where tasks are performed by remote processing devices that are linked through a communications network. In a distributed computing environment, program modules may be located in both local and remote computer storage media including memory storage devices. In operation, a processor such as in the computing device executes computer-executable instructions such as those illustrated in the figures to implement aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A method of processing high-volume continuous streams of data, said method comprising:
   receiving a query comprising query data and operator semantics, said query representing a request for data;
   translating the received query into a plurality of stream algebra operators;
   defining an execution plan representing a data flow implemented by the stream algebra operators;
   receiving a first event from a high-volume continuous data stream while maintaining minimal state information associated with the data;
   assigning an expiration time to the received first event as a function of the query data;
   receiving a plurality of second events from the data stream;
   executing one or more of the stream algebra operators according to the defined execution plan and as a function of the operator semantics from the received query to find a match between the received first event and at least one of the received plurality of second events prior to expiration of the first event based on the assigned expiration time associated with the first event wherein:
      if one of the second events does not match the first event, then continuing to wait until another second event is received; and
      if one of the second events matches the first event, then combining the first and second events to produce a third event; and
   executing the third event according to the execution plan.

2. The method of claim 1, wherein translating the query comprises compiling a description of the stream algebra operators into assembly code for efficient execution.

3. The method of claim 1, further comprising distributing one of the stream algebra operators to a destination computing device by:
   pausing execution of the stream algebra operator;
   storing state information maintained by the stream algebra operator; and
   sending the stream algebra operator and the stored state information to the destination computing device.

4. A method of processing high-volume continuous streams of data while maintaining minimal state information associated with the data, said method comprising:

receiving a query comprising query data and operator semantics, said query representing a request for data;

translating the received query into a plurality of stream algebra operators;

defining an execution plan representing a data flow implemented by the stream algebra operators;

receiving a first event from a data stream;

assigning an expiration time to the received first event as a function of the query data;

receiving a plurality of second events from the data stream;

executing one or more of the stream algebra operators according to the defined execution plan and as a function of the operator semantics from the received query to find a match between the received first event and at least one of the received plurality of second events prior to expiration of the first event based on the assigned expiration time associated with the first event;

producing, as a function of said executing, a third event to be executed according to the execution plan;

identifying the destination computing device and the one of the stream algebra operators based on the execution plan;

pausing execution of the stream algebra operator;

storing state information maintained by the stream algebra operator; and sending the stream algebra operator and the stored state information to the destination computing device.

5. A method of processing high-volume continuous streams of data while maintaining minimal state information associated with the data, said method comprising:

receiving a query comprising query data and operator semantics, said query representing a request for data;

translating the received query into a plurality of stream algebra operators;

defining an execution plan representing a data flow implemented by the stream algebra operators;

receiving a first event from a data stream;

assigning an expiration time to the received first event as a function of the query data;

receiving a plurality of second events from the data stream;

executing one or more of the stream algebra operators according to the defined execution plan and as a function of the operator semantics from the received query to find a match between the received first event and at least one of the received plurality of second events prior to expiration of the first event based on the assigned expiration time associated with the first event;

producing, as a function of said executing, a third event to be executed according to the execution plan; and adjusting the expiration time assigned to the first event to minimize the quantity of state information maintained by the stream algebra operator.

6. The method of claim 1, further comprising assigning an expiration time to each of the received plurality of second events, wherein the assigned expiration time comprises infinity or zero.

7. The method of claim 1, further comprising maintaining a state of the first event only until the first event has expired based on the associated expiration time.

8. The method of claim 1, further comprising discarding the first event as a function of the assigned expiration time.

9. The method of claim 1, wherein receiving the first event comprises receiving a request for data, and wherein receiving the plurality of second events comprises receiving a plurality of responses.

10. A system for processing high-volume continuous streams of data while maintaining minimal state information associated with the data, said system comprising:

a processor configured to execute computer-executable instructions for:

receiving a query comprising query data and operator semantics, said query representing a request for data; and translating the received query into a plurality of stream algebra operators;

a memory area for storing the plurality of stream algebra operators for building a distributed stream processing operator graph, each of said stream algebra operators being adapted to perform one or more functions on data events from an event stream; and said processor configured to execute computer-executable instructions for building a distributed operator graph using the stream algebra operators stored in the memory area by:

defining an object to include an expression, said expression representing the one or more functions to be performed on the data events from the event stream;

serializing the defined object including the expression into a message corresponding to one of the plurality of stream algebra operators stored in the memory area;

identifying one of a plurality of destination computing devices to host said one of the plurality of stream algebra operators;

transmitting the message to the identified destination computing device to build the distributed operator graph, wherein the destination computing device compiles the expression from the message into executable code representing said one of the plurality of stream algebra operators implementing a portion of the operator graph, wherein the executable code operates on the data events received from the event stream to produce aggregated events;

receiving the aggregated events from the destination computing device; and processing the aggregated events in accordance with another portion of the operator graph implemented by the processor.

11. The system of claim 10, wherein the data events comprise one or more of the following: a class instance, a C# event, and a message.

12. The system of claim 10, wherein the memory area further stores an alterlifetime operator for adjusting a timestamp associated with a data event received from the event stream.

13. The system of claim 10, further comprising one or more of the following:

means for building the distributed operator graph, means for generating the expression, and means for identifying the one of the plurality of destination computing devices to host said one of the plurality of stream algebra operators.

14. The system of claim 10, wherein the processor is configured to execute computer-executable instructions for identifying the one of the plurality of destination computing devices as a function of a placement algorithm.

15. The system of claim 10, wherein the data events comprise an insert event, and wherein processing of the insert event adds information associated with the insert event to a computation state associated with one of the stream algebra operators.

16. The system of claim 10, wherein receiving the aggregated events from the destination computing device comprises receiving locally aggregated events from each of a plurality of destination computing devices, and wherein the processor is further configured to execute computer-executable instructions for globally aggregating the received locally aggregated event in accordance with the operator graph implemented by the processor.

* * * * *